United States Patent Office 2,858,171
Patented Oct. 28, 1958

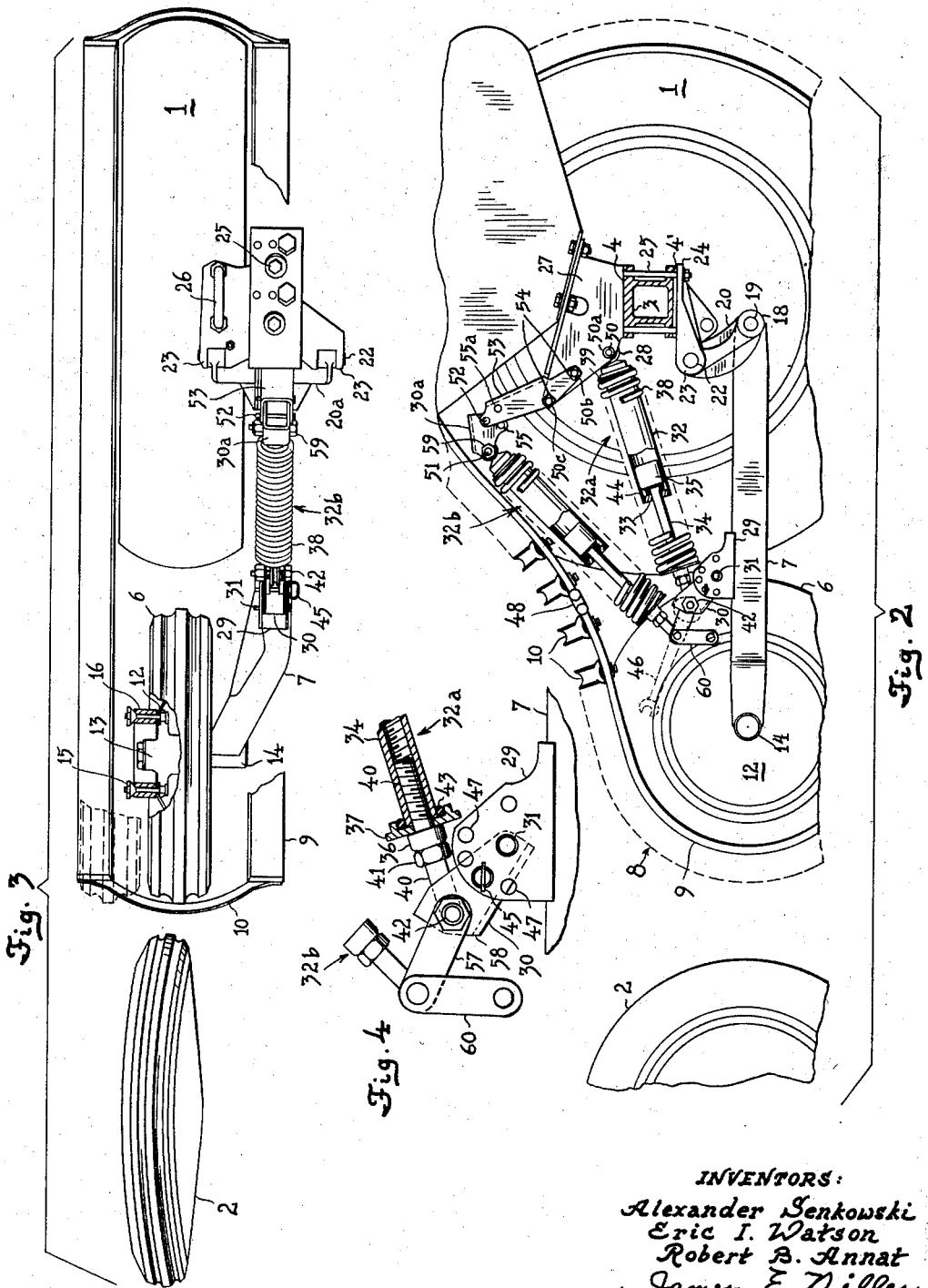

2,858,171
TRACK ATTACHMENT FOR WHEELED TRACTORS

Alexander Senkowski, Coventry, Eric I. Watson, Birmingham, and Robert B. Annat, Leamington Spa, England, assignors to Massey-Ferguson Inc., a corporation of Maryland Application October 27, 1955, Serial No. 543,048

Claims priority, application Great Britain November 2, 1954

10 Claims. (Cl. 305—8)

This invention relates to endless track attachments for wheeled tractors of the type having a bogey or idler wheel for supporting and guiding the front end of the track.

In track attachments of the above general type, the idler wheels are carried by independent supporting structures secured to the rear axle housings of the tractor and the wheels are spring biased to maintain the track under tension and to hold its forward end in engagement with the ground. The tractor drive wheel and the idler wheel hold the track in a position to define a generally flat ground contacting surface of relatively large area which affords increased flotation and better traction than the traction wheels alone.

Attachments of this type are usually only required temporarily, for instance, when soft ground conditions or other considerations make conventional wheel drive unsuitable. Installation of these attachments is usually made at home by the owner or user who has only the simplest of tools available. Tractors with which these attachments are used have no special provisions for mounting them and practical considerations dictate the use of clamping means for securing the idler wheel supporting structures to the tractor. It has been a difficult and time consuming task to install and align these idler wheels with the traction wheels so as to preclude the tracks from slipping off when the tractor is driven and to position the track over the idler and traction wheels or to remove it therefrom.

It is therefore an object of this invention to provide a track attachment of the above type which provides a quick-release arrangement that facilitates the installation or removal of the track.

It is another object of this invention to provide a track attachment of the above type which makes provision for the arm that mounts the idler wheel to not only swing in a vertical direction but also in a fore and aft direction to facilitate installation or removal of the track. There is also provided efficient resilient means for urging the idler wheel into contact with the ground and for maintaining proper tension in the track; said resilient means capable of being easily rendered inoperative so as to facilitate removal or installation of the track.

It is another object of this invention to provide a track attachment of the above type which can be easily rendered inoperative without removing the endless track.

Other objects and advantages will become more apparent from the following detailed description and attached sheets of drawings wherein a form of the invention is illustrated.

Figure 2 is a view similar to Figure 1, showing the support structure for the idler wheel in the inoperative position.

Figure 3 is a plan view of the arrangement shown in Figure 1 with certain parts in section and certain parts broken away for the sake of clarity in the drawings.

Figure 4 is a fragmentary view, on an enlarged scale, partially in section, of the spring-strut toggle linkage in the inoperative position as shown in Figure 2.

Figure 1:
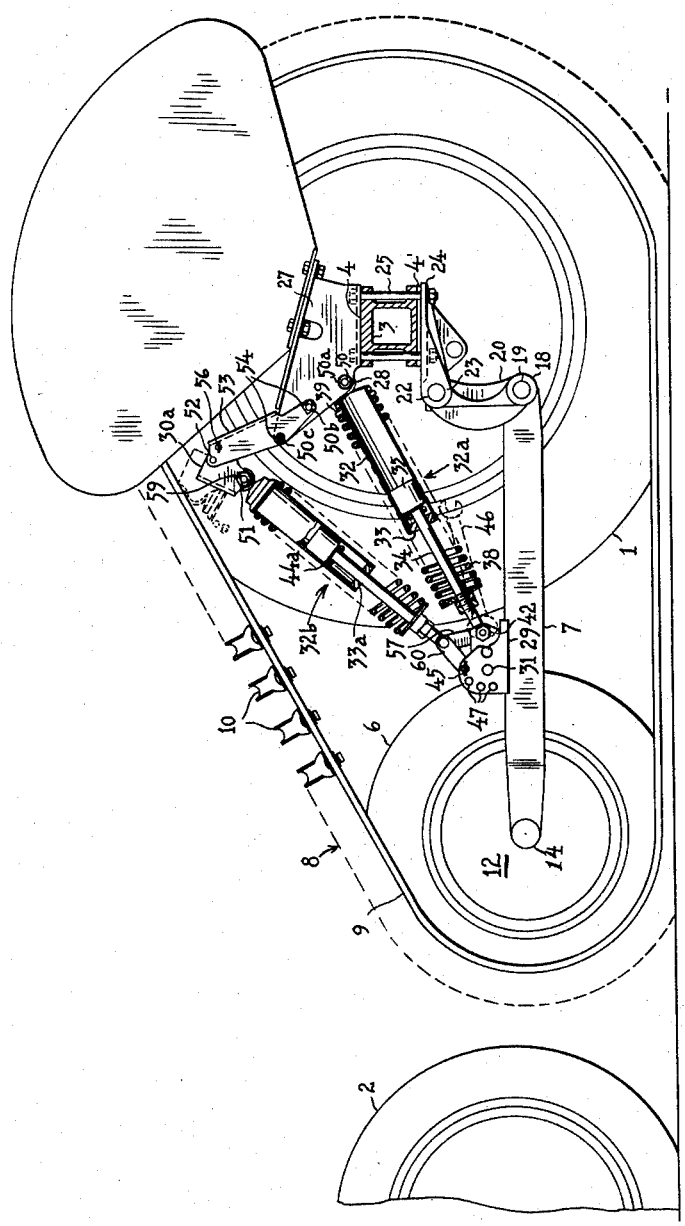
Figure 1 is a side elevational view, partially in section and with certain parts removed, of the invention as applied to a tractor.

While we have shown and will describe herein in detail a preferred form of the invention, it is to be understood that it is not intended to limit the invention to the precise form illustrated but, on the contrary, it is intended to cover all changes, modifications and alternative constructions falling within the spirit and scope of the invention as expressed in the appended claims.

The track attachments are applied to the rear wheels of the tractor and as they are identical only one is shown and described. The parts of the tractor shown here are of the well known Ferguson four-wheel type having a rear traction wheel 1 and smaller front steering wheels 2. The conventional rear axle housing 3 has a flat upper portion 4 and a flat lower portion 4'.

Each track attachment comprises an idler wheel 6 carried by an arm 7 which is attached to the tractor rear axle in a manner to be described later, and an endless track 8. The track 8 consists of two fabric-reinforced rubber bands 9 which are pre-stretched in manufacture. These bands 9 are inter-connected by curved cross links or track members 10. The endless track 8 is fitted around the tire 1 of the tractor rear wheel and around the idler wheel 6.

The idler wheel 6 consists of a dished disc 12 which is attached to a hub 13, rotatable on the inwardly projecting end 14 of the arm 7. The disc 12 is attached to the hub 13 by bolt means 15, and spacers 16.

In the "Ferguson" tractor the rear wheels are capable of track width adjustment, and it is desirable that the idler wheel 6 and the endless track 8 should be capable of adjustment through at least part of the tractor wheel range of adjustment. In the present arrangement the idler wheel 6 is capable of adjustment into four different track widths. One extreme position is shown in full lines in Fig. 3 with the disc 12 at the inner end of the spacer 16. The other extreme position is shown in dotted lines where the disc 12 is reversed and is at the outer end of the spacer 16. Two further intermediate track widths can be obtained by reversing the dished disc 12 in either of the two above positions.

The mounting for the idler wheel 6 consists of the tubular arm 7, the rear end of which is pivotally connected by a pin 19 between bosses 18 on the forked lower end of a short dependent link 20, provided with a cross web 20a. The link 20 is pivotally connected at its top end by a pin 22 between lugs 23 on a bracket plate 24, which is attached to the bottom flat 4' on the housing 3 by bolts means 25 and also by a U bolt 26 (Fig. 3). The arm 7 is thus capable of pivotal and fore and aft movement relative to the housing 3.

Movement of the idler wheel 6 and the arm 7 is controlled by a spring-strut assembly which is pivoted at one end to a part of the tractor and is pivoted at the other end to the arm 7 intermediate the length of the latter. This assembly has pivotal connections at its ends to an upper, channel-section bracket 27, which is attached to the top flat 4 by the bolts 25, and a lower channel-section bracket 29 on the arm 7. The bracket 27 extends forwardly and upwardly from the top flat 4 and is formed with three pairs of holes 50A, 50B, 50C formed on a radius with the lower attachment point 42 (Figure 1) for the spring-strut assembly as a center to give alternative attachment points for the upper end of the assembly. An eye-piece 28 at the top of the spring-strut assembly is inserted between the desired pair of holes and secured in position by a pin 50.

It will be appreciated that the more steeply the spring-strut assembly is arranged relative to the arm 7, the greater the proportion of its effort is applied to give ground pressure to the idler wheel 6, that is, if the spring-strut assembly is attached between the holes 50C it gives a greater ground pressure to the idler wheel 6 than if the assembly were attached between the pairs of holes 50A or 50B. This increase in the ground pressure on the idler wheel 6 takes some of the weight from the rear wheels 1 and ensures a more even weight distribution over the endless track 8, and this is highly desirable, if not essential, when ground conditions are extremely bad, for example when the ground is covered with snow or is boggy, since it obviates or mitigates any tendency of the rear part of the track to dig into the ground while the front part rises therefrom.

The spring-strut assembly is in effect a toggle linkage consisting of two pivotally inter-connected component links. The lower one of these links is a short member 30 of inverted-U cross section, the outer end of which is pivotally connected by a pin 31 to the bracket 29 on the arm 7. The upper part of the component links is a spring-strut unit 32a. This unit includes an upper telescopic part consisting of a tube 32 upon which the terminal eye-piece 28 is secured. The lower end of this tube 32 has a closure plug 33. The spring-strut unit also includes a lower telescopic part consisting of a hollow rod 34 passing through the plug 33 and having a piston 35 within the tube 32. The rod 34 at its lower end (Fig. 4) has welded to it a ring 36 which supports a seat 37 for the lower end of a compression spring 38. The upper end of this spring engages a collar 39 provided at the upper end of the tube 32. The spring-strut unit also includes a rod 40, which is screwed into the hollow rod 34 and is secured by a locknut 41. The rod 34 ends in an eye-piece which is pivotally connected by a bolt 42 to the inner end of the link 30. The bolt 42 forms the piovtal connection between the two component links 30 and 32a of the toggle linkage.

Rubber stop rings 43 and 44 are provided on the rod 34 to cooperate with the plug 33 in order to limit the relative movement of the telescopic parts of the spring-strut assembly. Thus if the lower ring 43 should contact the plug 33 the spring-strut unit would be fully contracted. Correspondingly, whenever the upper ring 44 contacts the plug 33, the unit is fully extended.

Normally, when the endless track is in use, (Fig. 1) the link 30 rests on the bracket 29 and is locked in position by a pin 45, which is inserted through aligned holes in the bracket 29. The spring strut assembly presses forwardly and downwardly on the arm 7 through the link 30 and bracket 29, and owing to the piovtal connection at 19 and the swinging connection through the link 20, the arm 7 presses the idler wheel 6 forwardly and downwardly to tension the endless track 8. The downward component of this pressure on the idler wheel 6 serves to maintain ground contact by the track 8 and to resist upward inertia effects on the arm 7 and track 8 in the event that the idler wheel 6 strikes an obstacle. Thus with this arrangement, whenever the idler wheel 6 rises over an obstacle, the spring stress increases and correspondingly the tractive grip of the track 8 on the ground increases so that the track 8 is better able to climb over the obstacle. The spacing, however, of the various parts of the track attachment is such that this increase in spring stress does not materially increase the tension on the track throughout the normal working thereof. Moreover, if the obstacle imparts a sudden bump to the idler wheel 6, the parts are safeguarded against upward and rearward inertia effects and shock. The spring strut assembly therefore performs a dual function of maintaining the track under tension and urging the idler wheel 6 groundwards to enhance the tractive grip of the track 8.

Although in the position of the parts shown in Fig. 1 the spring-strut assembly acts as a simple spring-strut, as already explained the assembly is in effect a toggle linkage. In the Fig. 1 position, the linkage is deflected to the lower side of the dead-centre setting (in which the link 30 is aligned with the unit 32a).

To facilitate fitting of the endless track 8 around the rear wheel 1 and idler wheel 6, the operator withdraws the pin 45, engages the bolt 42 with a wrench 46 and turns the link 30 upwards so that it passes through and beyond the dead-centre (Figure 2). In this movement, the spring-strut unit 32a is initially further compressed, but beyond the dead-centre the spring-strut unit expands, until finally the stop ring 44 abuts against the plug 33 so that the spring-strut unit 32a cannot extend further and becomes, in effect, an inextensible link. Thereafter, further turning of the lower link 30 by the wrench 46 causes the arm 7 to be pulled rearwards, the effect of which is to withdraw the idler wheel 6 towards the rear wheel 1 and slacken the track 8, as shown in Fig. 2. The link 30 can be fixed in the inoperative position by inserting the pin 45 through the appropriate pair of holes 47, and through the aligned hole in link 30. The slackened track 8 can easily be removed from the wheels 1 and 6.

Correspondingly, when the link 30 is thus locked in its inoperative or idler-withdrawing position, it is easy to fit the track 8 in position.

When the ground conditions are extremely bad as previously mentioned, an auxiliary readily detachable spring-strut unit 32b may be fitted to increase the ground pressure on the idler wheel 6 and thus ensure a more even weight distribution over the endless track 8.

The additional spring-strut assembly is also a toggle linkage and is identical with that previously described. In this case, however, the spring-strut unit 32b is the lower member of the toggle linkage and the short member or link 30a is the upper member, the spring-strut unit 32b and the link 30a being pivoted together at 51. The link 30a is pivoted at 52 to an extension bracket 53 which extends upwardly and forwardly from the bracket 27 and which is secured to the latter by bolts 54 passing through the pairs of holes 50B, 50C. The link 30a and bracket 53 (Fig. 2) are provided with holes 55 and 55a respectively which are in register when the link 30a is in an over-centre position, as shown in full lines in Fig. 1, and a removable pin 56 is passed through the registered holes to lock the link 30a in the over-centre position.

At its lower end the spring-strut unit 32b is pivoted between a pair of links 57 (Fig. 4) pivotally mounted on the bolt 42, the link 30 being cut away as indicated at 58 to form an abutment for the links 57 so as to limit movement of the latter relative to link 30 in one direction. Additional restraining links 60 are provided to prevent the upper toggle joint 57—32b from going downwardly beyond dead-center and damaging the lower spring unit 32a. This undesirable movement would otherwise occur when the idler wheel dropped into a depression carrying with it arm 7. This movement in turn would cause the upper spring unit 32b and links 57 to straighten and go inwardly over center. Common means are provided for holding the lower end of unit 32b in operative position and for holding the lower toggle linkage in operative position. This means takes the form of the pin 45 which holds the retaining links 60 in bracket 29 and also serves to hold link 30 down in the operative position as mentioned earlier.

It will be manifest that the line of action of the additional spring-strut unit 32b is much steeper than that of the unit 32a, and that it is therefore much more effective as regards giving ground pressure to the idler wheel 6 and thus ensures a more even weight distribution over the endless track 8.

To facilitate fitting of the endless track 8 around the rear wheel 1 and the idler wheel 6 with the additional spring-strut unit 32b in position, the operator withdraws the pin 56 from the holes 55, engages a nut 59 with the wrench 46 and turns the member 30a upwards so that it passes through and beyond the dead-centre. In this movement, the spring-strut unit 32b is initially further compressed, but beyond the dead-centre in the spring-strut unit 32b expands, until finally the stop ring 44a abuts against the plug 33a so that the spring-strut unit 32b cannot extend further and becomes, in effect, an inextensible link. Thereafter, the other spring-strut unit 32a is released as hereinbefore described to withdraw the idler wheel 6 towards the rear wheel 1 and thus facilitating fitting of the track round said wheels 1 and 6 for removal of the track therefrom.

It will be appreciated that the additional spring-strut unit 32b is easily and readily removable and is preferably used only when ground conditions are exceptionally bad.

The track may be truly endless (Fig. 1) or it may be provided with detachable end connections 48 (Fig. 2) which allow the track to be laid out flat on the ground. In the former case, to fit the endless track, it is slipped over the idler wheel 6 and the associated rear wheel 1 when the link 30 is in the position shown in Fig. 2. In the latter case, the track is laid out flat on the ground and the tractor driven on top of it, after which the track is led around the two wheels, the free ends of the track being brought into contact and inter-connected when the link 30 is in the position shown in Fig. 2.

One advantage of the endless track attachment according to the embodiment shown is that the endless track can be temporarily put out of action, if desired, without removing the endless track attachment from the tractor by raising the idler wheel and endless track clear of the ground and locking them in this position. This is attained by rotating the link 30 to urge the wheel-carrying arm 7 rearwards as far as it will go, that is, until it engages the cross web 20a of the link 20 and prevents relative movement between arm 7 and link 20. Alternately the link 20 can be adapted to abut against a fixed part of the tractor. In either case, rotation of the link 30 cannot, therefore, push the arm 7 back any farther since the pivot 19 is fixed. Therefore, the pivot 31 is also stopped from going back and as the spring-strut unit 32a cannot extend further, the arm 7 and the link 20 swing up as one unit around the top pivot 50 of the suspension link 32a. Thus the idler wheel 6 and track 8 are raised clear of the ground and can be held thereby insertion of the pin 45 in one of the pairs of holes 47.

Having thus shown and described the invention what is desired to be secured by Letters Patent is:

1. A track attachment for a tractor having a traction wheel and an axle housing for said wheel, comprising, an arm mounted at one end to said housing for pivotal and fore and aft bodily shifting relative thereto, an idler wheel rotatably mounted at the other end of said arm, an endless track trained around said idler and traction wheels, a toggle linkage pivotally connected at one end to said tractor and at the other end to said arm intermediate its length, said linkage having resilient means adapted to tension said track and urge said idler wheel against the ground, said linkage adapted to go over a dead-centre position whereby said means is extended and said arm shifted toward said traction wheel to slacken said track.

2. A device as defined in claim 1 further characterized in that said linkage includes a spring-strut unit which is extensible to a predetermined extent.

3. A device as defined in claim 1 further characterized in that an auxiliary toggle linkage is pivotally attached at one end to said tractor at a point located above said first toggle linkage and pivotally attached at the other end with said first toggle linkage, common means for holding both toggle linkages in the operative position.

4. A track attachment for a tractor having a traction wheel and an axle housing for said wheel, comprising, an arm mounted at one end to said housing for pivotal and fore and aft bodily shifting relative thereto, an idler wheel rotatably mounted at the other end of said arm, an endless track trained around said idler and traction wheels, an extensible toggle linkage pivotally connected at one end to said tractor and at the other end to said arm intermediate its length and adapted to be held rigid when in the operative position, said linkage having resilient means adapted to tension said track and urge said idler wheel against the ground, said linkage adapted to go over a dead-centre position whereby said means is extended and said arm shifted toward said traction wheel to slacken said track.

5. A track attachment for a tractor having a traction wheel and an axle housing for said wheel, comprising, an arm mounted at one end to said housing for pivotal and fore and aft bodily shifting relative thereto, an idler wheel rotatably mounted at the other end of said arm, an endless track trained around said idler and traction wheels, a toggle linkage pivotally connected at one end adjacent said housing and at the other end to said arm intermediate its length said linkage having extensible and resilient means adapted to tension said track and urge said idler wheel against the ground, said linkage adapted to go over a dead-centre position whereby said means is extended and said arm shifted toward said traction wheel to slacken said track.

6. A track attachment for a tractor having a traction wheel and an axle housing for said wheel, comprising, an arm mounted at one end to said housing for pivotal and fore and aft bodily shifting relative thereto, an idler wheel rotatably mounted at the other end of said arm, an endless track trained around said idler and traction wheels, a toggle linkage pivotally connected at one end adjacent said housing and at the other end to said arm intermediate its length and adapted to be held substantially at a dead-centre position in the operative position, said linkage having extensible and resilient means adapted to tension said track and urge said idler wheel against the ground, said linkage adapted to go over a dead-centre position whereby said means is extended and said arm shifted toward said traction wheel to slacken said track.

7. Means for mounting the idler wheel of a tractor track attachment to a tractor rear axle housing comprising, in combination, a downwardly depending link pivotally secured to said housing for fore and aft swinging relative thereto, an arm pivotally secured at one end to said link adjacent the lower end of the latter, the other end of said arm adapted to rotatably support an idler wheel, an extensible and resilient toggle linkage pivotally connected at one end to said arm and at the other end to said tractor, means for holding said linkage rigid while in the operative position.

8. A device as defined in claim 7 further characterized in that linkage, is adapted to go over center in the inoperative position whereby said arm is bodily shifted toward said housing.

9. An endless track attachment for a tractor having a traction wheel and an axle housing for said wheel, including, an arm carrying an idler wheel at one end and having a pivot for said arm at its other end, means for mounting said pivot on said axle housing so that the arm extends generally longitudinally of the tractor, said means permitting the arm to swing vertically about said pivot and to shift with said pivot longitudinally of the tractor, an endless track fitted around said traction and idler wheels, a spring strut unit pivotally connected between said tractor and said arm whereby said track is maintained taut and urged into contact with the ground.

10. A device as set out in claim 9 including an auxiliary spring strut pivotally connected to the tractor and to said arm at points so disposed so as to urge said arm substantially in a downward direction.

References Cited in the file of this patent
UNITED STATES PATENTS

| | | |
|---|---|---|
| 1,256,744 | Tolsma | Feb. 19, 1918 |
| 1,558,816 | King | Oct. 27, 1925 |
| 2,416,183 | Kraft | Feb. 18, 1947 |
| 2,719,062 | Arps | Sept. 27, 1955 |
| 2,726,903 | Arps | Dec. 13, 1955 |